United States Patent
Yoo et al.

(10) Patent No.: US 10,235,733 B2
(45) Date of Patent: Mar. 19, 2019

(54) DEVICE AND METHOD FOR PERFORMING SCHEDULING FOR VIRTUALIZED GRAPHICS PROCESSING UNITS

(71) Applicant: SAMSUNG ELECTRONICS CO., LTD., Suwon-si, Gyeonggi-do (KR)

(72) Inventors: Jae-yong Yoo, Gwangju (KR); Sung-min Lee, Suwon-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 504 days.

(21) Appl. No.: 14/974,476

(22) Filed: Dec. 18, 2015

(65) Prior Publication Data

US 2016/0189332 A1  Jun. 30, 2016

(30) Foreign Application Priority Data

Dec. 24, 2014 (KR) .................. 10-2014-0188642

(51) Int. Cl.

| | |
|---|---|
| *G06T 1/20* | (2006.01) |
| *G06F 3/0484* | (2013.01) |
| *G06F 3/14* | (2006.01) |
| *G06F 9/48* | (2006.01) |
| *G06F 3/0488* | (2013.01) |
| *G09G 5/14* | (2006.01) |
| *G09G 5/36* | (2006.01) |
| *G06F 9/455* | (2018.01) |

(52) U.S. Cl.
CPC ............ *G06T 1/20* (2013.01); *G06F 3/04847* (2013.01); *G06F 3/04883* (2013.01); *G06F 3/14* (2013.01); *G06F 9/48* (2013.01); *G06F 9/45504* (2013.01); *G06F 2203/04803* (2013.01); *G06F 2203/04808* (2013.01); *G09G 5/14* (2013.01); *G09G 5/363* (2013.01); *G09G 2350/00* (2013.01); *G09G 2360/06* (2013.01); *G09G 2370/20* (2013.01)

(58) Field of Classification Search
CPC . G06T 1/20; G06T 1/60; G06F 3/0482; G06F 3/06; G06F 3/0611; G06F 3/0629; G06F 3/0671; G09G 5/006
See application file for complete search history.

(56) References Cited

U.S. PATENT DOCUMENTS

| | | | |
|---|---|---|---|
| 8,884,974 B2 | 11/2014 | Dadi et al. | |
| 2013/0007406 A1 | 1/2013 | Sheaffer et al. | |
| 2013/0038614 A1* | 2/2013 | Dadi | G06T 1/20 |
| | | | 345/501 |
| 2013/0181998 A1 | 7/2013 | Malakapalli et al. | |
| 2014/0078144 A1* | 3/2014 | Berriman | A63F 13/10 |
| | | | 345/426 |
| 2014/0267323 A1 | 9/2014 | Koker et al. | |
| 2014/0310484 A1 | 10/2014 | Giroux | |

* cited by examiner

*Primary Examiner* — Carolyn R Edwards
(74) *Attorney, Agent, or Firm* — Nixon & Vanderhye, P.C.

(57) ABSTRACT

An example device including virtualized graphics processing units (vGPUs) is configured to respectively receive commands from a plurality of operating systems (OSs). A vGPU scheduler is configured to schedule an order and times for processing of the commands by a GPU. The vGPU scheduler can, for example, schedule the order and times such that a command from a foreground OS (FG OS) among the plurality of OSs is scheduled to be processed first.

20 Claims, 17 Drawing Sheets

DEVICE AND METHOD FOR PERFORMING SCHEDULING FOR VIRTUALIZED GRAPHICS PROCESSING UNITS

CROSS-REFERENCE TO RELATED APPLICATION

This application claims the benefit of Korean Patent Application No. 10-2014-0188642, filed on Dec. 24, 2014, in the Korean Intellectual Property Office, the disclosure of which is incorporated herein in its entirety by reference.

BACKGROUND

1. Field

The present disclosure relates to methods and devices for performing scheduling for a plurality of virtualized graphics processing units (GPUs) realized from a physical GPU.

2. Description of the Related Art

Graphics processing units (GPUs) may be used to perform various computing tasks. For example, GPUs may calculate pixels to be displayed on a screen and perform animation rendering and other computationally-intensive operations, e.g., general vector calculation.

Recently, as demands for high-definition (HD) movies or games, three-dimensional (3D) video, etc. have grown, the importance of GPUs has increased. Also, GPUs have drawn much attention as devices capable of performing not only graphic processing functions but also a large amount of calculation in place of a central processing unit (CPU).

As GPUs have been developed to perform important functions as described above, techniques of realizing virtualized GPUs by applying virtualization technology to GPUs have been developed. The virtualization technology enables many operating systems (OSs) to perform work in an independent execution environment by abstracting limited hardware resources and can be established and used without being influenced by system structure or hardware.

Accordingly, methods of more effectively using a GPU or a virtualized GPU are desirable.

SUMMARY

The present disclosure describes by way of example and without limitation methods and devices for performing scheduling preferentially for a virtualized graphics processing unit (GPU) receiving a command from a foreground operating system (OS) among a plurality of OSs.

According to an aspect of an example embodiment, a device including a physical graphics processing unit (GPU) includes a plurality of virtualized GPUs (vGPUs), realized from the GPU, configured to respectively receive commands from a plurality of operating systems (OSs); and a vGPU scheduler configured to schedule an order and times for processing, by the GPU, of the received commands, wherein the vGPU scheduler is further configured to schedule the order and times such that a command from a foreground OS (FG OS) among the plurality of OSs is scheduled to be processed first.

The device may further include a vGPU monitor configured to determine whether an amount of data of a command received by a first vGPU among the plurality of vGPUs is equal to or greater than a threshold when the first vGPU receives the command from a background OS (BG OS) among the plurality of OSs.

When the vGPU monitor determines that the amount of the data of the command received by the first vGPU is equal to or greater than the threshold, the vGPU scheduler may be further configured to schedule the order and times such that the command received by the first vGPU is scheduled to be processed by the GPU.

The device may further include a timer monitor configured to determine whether a time for which a command received by a first vGPU among the plurality of vGPUs is not processed is greater than a preset time when the first vGPU receives the command from a background OS (BG OS) among the plurality of OSs.

When the timer monitor determines that the time for which the command received by the first vGPU is not processed is greater than the preset time, the first vGPU may be further configured to inform the BG OS that a predetermined amount of data of the command is processed.

The device may further include a stop command unit or controller configured to control the vGPU scheduler to exclude commands from the plurality of OSs except for commands from a host OS from an object to be scheduled when the FG OS is the host OS.

The device may further include an access-mode changing unit or controller configured to change an object, which is to receive a command from the host OS, from a first vGPU among the plurality of vGPUs to the GPU when the first vGPU receives a command from the host OS.

The device may further include a controller configured to control display on a screen of a menu for selecting a scheduling mode in which the order and times are to be scheduled; and a user input device configured to receive a user input for selecting the scheduling mode through the menu displayed on the screen.

The vGPU scheduler may be further configured to schedule the order and times based on the scheduling mode selected according to the user input.

The device may further include an address converter and, when a first OS among the plurality of OSs transmits a command to a first address of a memory included in a first vGPU among the plurality of vGPUs, the address converter is configured to convert the first address to a second address for accessing a memory of the GPU so as to control the command to be processed at the second address of the memory of the GPU.

According to an aspect of an example embodiment, a method of performing scheduling for a plurality of virtualized graphics processing units (vGPUs) realized from a physical GPU includes receiving, by the plurality of vGPUs, commands from a plurality of operating systems (OSs); and scheduling an order in which and times for which the commands are to be processed by a GPU, wherein the scheduling of the order and times includes scheduling the order and times such that a command from a foreground OS (FG OS) among the plurality of OS is scheduled to be processed first.

According to an aspect of an example embodiment, there is provided a non-transitory computer-readable recording medium having recorded thereon a program for performing the method described above in a computer.

Additional aspects will be set forth in part in the description which follows and, in part, will be apparent from the description, or may be learned by practice of the presented example embodiments.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
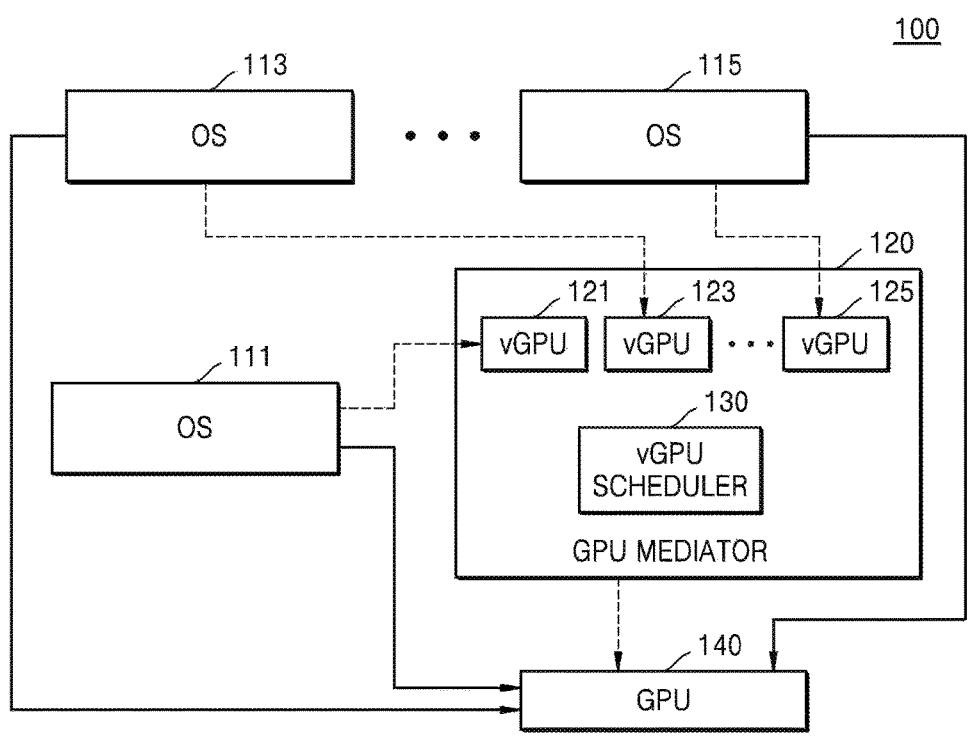
FIG. 1 is a block diagram of a device according to an example embodiment.

Reference will now be made in detail to example embodiments which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. As used herein, the term 'and/or' includes any and all combinations of one or more of the associated listed items. Expressions such as 'at least one of,' when preceding a list of elements, modify the entire list of elements and do not modify the individual elements of the list.

In the present disclosure, general terms that have been widely used nowadays are selected, if possible, in consideration of functions of the disclosed concepts, but non-general terms may be selected according to the intentions of technicians in the art, precedents, or new technologies, etc.

In the present disclosure, it will be understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof. Also, the terms 'unit', 'module', etc. should be understood as units that are configured to perform at least one function or operation and that may be embodied in hardware (e.g., circuitry which may dedicated or programmable), software, or a combination thereof.

It will be further understood that when an element or layer is referred to as being 'connected to' another element or layer, the element or layer may be directly connected to another element or layer or electrically connected to another element or layer via intervening elements or layers.

According to an example embodiment, devices 100, 200, 300, 400, and 500, which will be described below, may be embodied in many different forms. Examples of the devices 100, 200, 300, 400, and 500 may include, but are not limited to, mobile phones, smart phones, portable phones, laptop computers, tablet personal computers (PCs), e-book terminals, digital broadcasting terminals, personal digital assistants (PDAs), portable multimedia players (PMPs), navigation systems, smart televisions (TVs), and consumer electronics (CE) devices (e.g., a refrigerator or an air conditioner with a display panel, etc.).

Example embodiments will be described in detail with reference to the accompanying drawings below.

FIG. 1 is a block diagram of a device 100 according to an example embodiment.

The device 100 according to an example embodiment may include a plurality of operating systems (OSs) 111, 113, and 115, a graphics processing unit (GPU) 140, and a GPU mediator 120. FIG. 1 only illustrates components of the device 100 which are related to the present embodiment. It will be readily apparent to those of ordinary skill in the art that the device 100 may further include other general components in addition to the components illustrated in FIG. 1. Also, although FIG. 1 illustrates only three OSs 111, 113, and 115 and only three virtualized GPUs (vGPUs) 121, 123, and 125 for convenience of explanation, the number of OSs and the number of vGPUs are not limited to three.

The OSs 111, 113, and 115 are systems configured to manage hardware and software installed in the device 100, and may include various types of OSs. For example, the OSs 111, 113, and 115 may include at least one selected from an Android OS, a Windows OS, a Linux OS, and a Tizen OS. Also, the OSs 111, 113, and 115 may be OSs executed in a virtual machine.

According to an example embodiment, each of the OSs 111, 113, and 115 may be a foreground OS or a background OS. Foreground OS refers to an OS that is recognizable on a screen displayed on the device 100 by a user among OSs executed in the device 100. Background OS refers to an OS that is not recognizable on the screen on the device 100 by a user among the OSs executed in the device 100. For example, if the Android OS, the Windows OS, and the Tizen OS are simultaneously executed in the device 100, the Android OS may be a foreground OS and the Windows OS and the Tizen OS may be background OSs when the Android OS is being used on the screen on the device 100. However, when the Android OS and the Windows OS are simultaneously used by a user on separate screens displayed on the device 100, the Android OS and the Windows OS may be foreground OSs and the Tizen OS may be a background OS.

For convenience of explanation, the terms 'foreground OS' and 'background OS' will be referred to as an 'FG OS' and a 'BG OS', respectively.

According to an example embodiment, the OSs 111, 113, and 115 may directly access the GPU 140 or may indirectly access the GPU 140 via the GPU mediator 120. In FIG. 1, solid-line arrows each denote direct access of one of the OSs 111, 113, and 115, and broken-line arrows each denote indirect access of one of the OSs 111, 113, and 115. For example, the OSs 111, 113, and 115 may directly access the GPU 140 to store graphics data in a memory included in the GPU 140. Otherwise, the OSs 111, 113, and 115 may indirectly access the GPU 140 to transmit a command to the GPU 140 via the GPU mediator 120. The GPU 140 may process the received command. For example, the GPU 140 may perform rendering using the graphics data stored in the memory therein.

The GPU mediator 120 according to an example embodiment may include the plurality of vGPUs 121, 123, and 125, and a vGPU scheduler 130.

In the device 100 according to an example embodiment, the GPU 140, which is a physical hardware unit, may be virtualized to obtain the vGPUs 121, 123, and 125. The vGPUs 121, 123, and 125 according to an example embodiment may respectively receive commands from the OSs 111, 113, and 115. The vGPUs 121, 123, and 125 may access the GPU 140 and transmit the received commands to the GPU 140, and the GPU 140 may process the commands. Hereinafter, that a vGPU accesses a GPU should be understood to include that the GPU receives a command from the vGPU and processes the command.

The vGPU scheduler 130 (e.g., circuitry which may dedicated or programmable) according to an example embodiment may schedule times for which and an order in which the vGPUs 121, 123, and 125 will access the GPU 140. That is, the vGPU scheduler 130 may schedule an order in which and times for which commands respectively received by the vGPUs 121, 123, and 125 are to be processed by the GPU 140. For example, when three vGPUs (a first vGPU, a second vGPU, and a third vGPU) respectively receive commands from three OSs, the vGPU scheduler 130 may schedule an order in which and times for which the three vGPUs will access the GPU 140 such that the first vGPU, the second vGPU, and the third vGPU will sequentially access the GPU 140 at intervals of 10 msec. Thus, the GPU 140 may process the commands respectively received from the first vGPU, the second vGPU, and the third vGPU at intervals of 10 msec.

Also, the vGPU scheduler 130 may perform context switching on the vGPUs 121, 123, and 125 according to the scheduled order and times. In context switching, when a time given to one of the vGPUs 121, 123, and 125 to access the GPU 140 elapses, a next vGPU is controlled to access the GPU 140 according to the scheduled order and times. For example, when the three vGPUs (the first to third vGPUs) are scheduled to access the GPU 140 in the order of the first vGPU, the second vGPU, and the third vGPU and at intervals of 10 msec, the vGPU scheduler 130 may perform context switching to change a vGPU having an access to the GPU 140 from the first vGPU to the second vGPU 10 msec after the first vGPU accesses the GPU 140.

According to an example embodiment, the vGPU scheduler 130 may recognize an FG OS among the OSs 111, 113, and 115. Thus, when the first OS 111 among the OSs 111, 113, and 115 is an FG OS and a command from the first OS 111 is received by the first vGPU, the vGPU scheduler 130 may determine an order in which and times for which the three vGPUs will access the GPU 140 such that the command from the first OS is to be first processed. That is, the vGPU scheduler 130 may assign an order in which the first vGPU may first access the GPU 140, and assign a large time to the first vGPU to access the GPU 140, compared to the other vGPUs. For example, when a third vGPU among three vGPUs (a first vGPU, a second vGPU, and a third vGPU) receives a command from an FG OS, the vGPU scheduler 130 may perform scheduling such that the third vGPU, the first vGPU, and the second vGPU will access the GPU 140 for 28 msec, 1 msec, and 1 msec, respectively. Also, according to an example embodiment, the vGPU scheduler 130 may perform scheduling such that only vGPUs receiving commands from only FG OSs have access to the GPU 140.

Thus, since a vGPU receiving a command from an FG OS may first access a GPU and a command from the FG OS may be thus first processed, a user may recognize that the performance of the GPU for the FG OS is high.

Figure 2:
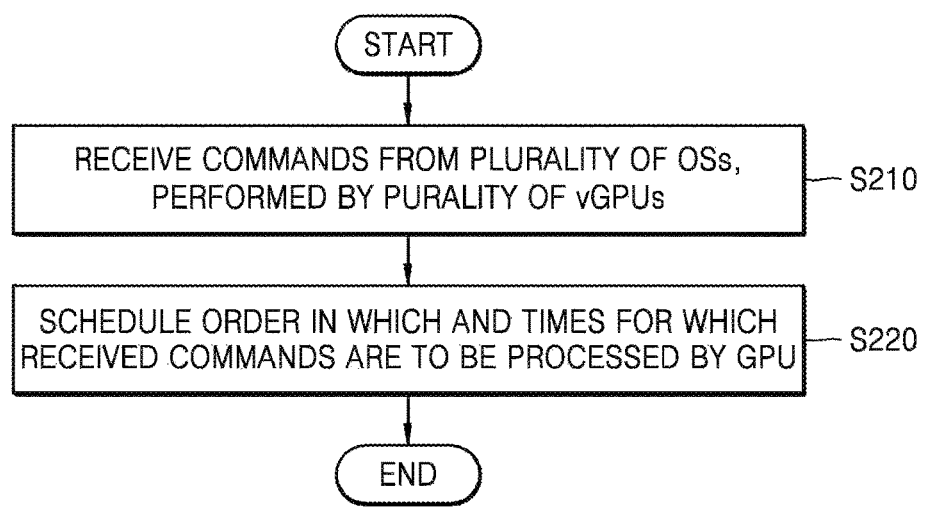
FIG. 2 is a flowchart of a method of performing scheduling for a plurality of virtualized graphics processing units (vGPUs) realized from a GPU, the method being performed by a device, according to an example embodiment.

FIG. 2 is a flowchart of a method of performing scheduling for a plurality of vGPUs realized from a GPU, performed by the device 100 of FIG. 1, according to an example embodiment.

The method of FIG. 2 may be performed by the components of the device 100 of FIG. 1 and thus parts of the method of FIG. 2 that are the same as those of the device 100 described above are not described again here.

In operation S210, a plurality of vGPUs included in the device 100 may receive commands from a plurality of OSs, respectively.

In operation S220, the device 100 may schedule an order in which and times for which the commands respectively received by the vGPUs are to be processed by the GPU. That is, the device 100 may schedule an order in which and times for which the vGPUs will respectively access the GPU 140. According to an example embodiment, the device 100 may recognize an FG OS among the plurality of OSs. Thus, the device 100 may determine the order and times such that a command from the FG OS among the plurality of OSs is to be first processed. That is, the device 100 may assign an order in which a vGPU receiving a command from the FG OS is to first access the GPU 140 and assign a large time to the vGPU receiving a command from the FG OS, compared to the other vGPUs.

Figure 3:
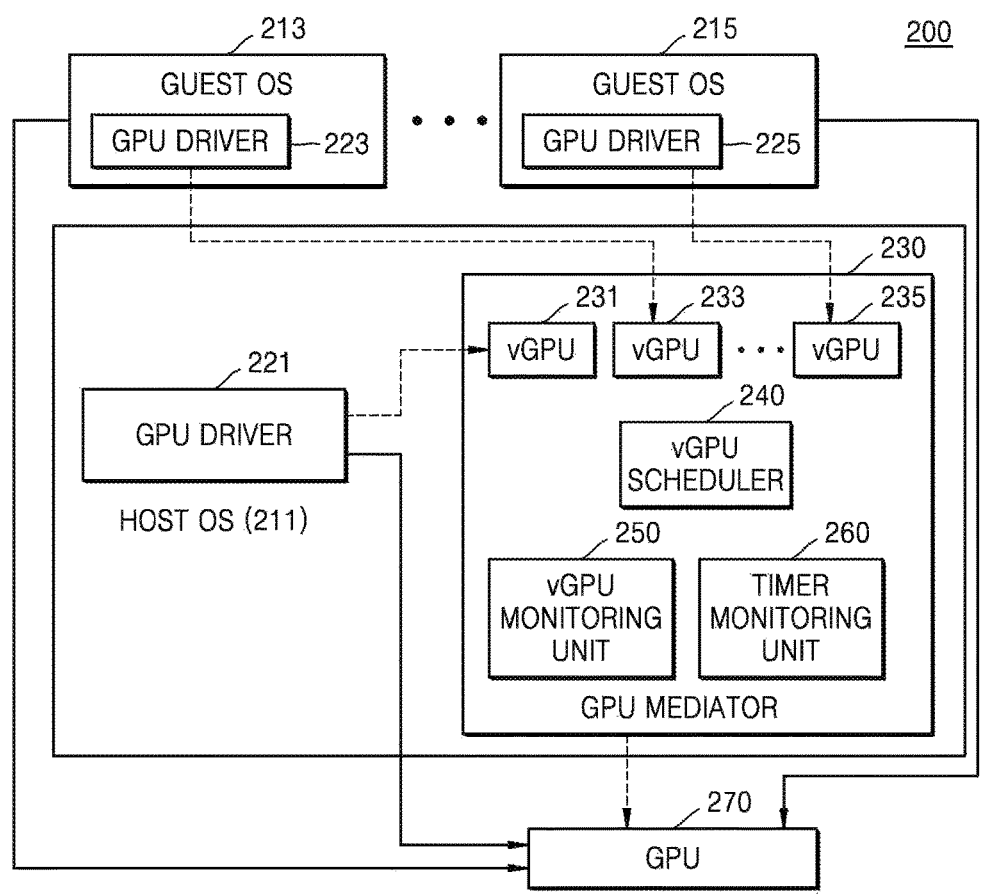
FIG. 3 is a block diagram of a device according to another example embodiment.

FIG. 3 is a block diagram of a device 200 according to another example embodiment.

The device 200 according to an example embodiment may include a plurality of OSs 211, 213, and 215, a GPU 270, and a GPU mediator 230. FIG. 3 illustrates only components of the device 200 which are related to the present embodiment. It will be readily apparent to those of ordinary skill in the art that the device 200 may further include other general components in addition to the components illustrated in FIG. 3.

Some parts of the plurality of OSs 211, 213, and 215, the GPU 270 and the GPU mediator 230 of FIG. 3 are as described above with reference to FIG. 1 and are not described again here.

As illustrated in FIG. 3, the plurality of OSs 211, 213, and 215 may include one host OS 211 and guest OSs 213 and 215. According to an example embodiment, the device 200 may basically include the one host OS 211 and additionally include the guest OSs 213 and 215. According to an example embodiment, the guest OSs 213 and 215 may be respectively driven in a plurality of virtual machines in the device 200.

Although FIG. 1 illustrates the plurality of OSs 111, 113, and 115 and the GPU mediator 120 separately, the host OS 211 according to an example embodiment may include the GPU mediator 230 as illustrated in FIG. 3. Thus, in the present disclosure, although for convenience of explanation, a host OS is illustrated to include a GPU mediator, it should be understood that a plurality of OSs and the GPU mediator may be arranged separately.

According to an example embodiment, the host OS 211 and the guest OSs 213 and 215 may include GPU drivers 221, 223, and 225, respectively. The GPU drivers 221, 223, and 225 are each, for example, software for driving the GPU 270. According to an example embodiment, the GPU drivers 221, 223, and 225 may access vGPUs 231, 233, and 235 and transmit commands to the vGPUs 231, 233, and 235, respectively. According to an example embodiment, the GPU drivers 221, 223, and 225 may directly access the GPU 270 as indicated by solid-line arrows. Hereinafter, that the OSs 211, 213, and 215 access the GPU 270 or the vGPUs 231, 233, and 235 or transmit commands to the GPU 270 or the vGPUs 231, 233, and 235 should be understood to include that the GPU drivers 221, 223, and 225 access the GPU 270 or the vGPUs 231, 233, and 235 or transmit commands to the GPU 270 or the vGPUs 231, 233, and 235.

The GPU mediator 230 according to an example embodiment may include the vGPUs 231, 233, and 235, a vGPU scheduler 240, a vGPU monitoring unit 250, and a timer monitoring unit 260.

The vGPUs 231, 233, and 235 may respectively receive commands from the GPU drivers 221, 223, and 225 included in the OSs 211, 213, and 215.

The vGPU monitoring unit (or vGPU monitor) 250 (e.g., circuitry which may dedicated or programmable) according to an example embodiment may recognize a vGPU receiving a command from a BG OS among the OSs 211, 213, and 215. When a vGPU receiving a command from the BG OS among the vGPUs 231, 233, and 235 is a first vGPU, the vGPU monitoring unit 250 determines whether the amount of data of the command received by the first vGPU is equal to or greater than a predetermined threshold. According to an example embodiment, the vGPU monitoring unit 250 may monitor a command buffer of the first vGPU to determine whether the amount of data of the command stored in the command buffer is equal to or greater than the predetermined threshold. When the vGPU monitoring unit 250 determines that the amount of data of the command received by the first vGPU is equal to or greater than the predetermined threshold, the vGPU scheduler 240 may perform context switching such that the GPU 270 processes the command received by the first vGPU.

For example, when a vGPU receiving a command from an FG OS among the vGPUs 231, 233, and 235 is the first vGPU and a vGPU receiving a command from a BG OS among the vGPUs 231, 233, and 235 is a second vGPU, the vGPU scheduler 240 may perform scheduling such that the command received by the first vGPU is to be first processed. Then, while the command received by the first vGPU is processed by the GPU 270, the vGPU monitoring unit 250 may determine whether the amount of data of the command received by the second vGPU is equal to or greater than the predetermined threshold. Thus, when the vGPU monitoring unit 250 determines that the amount of data of the command received by the second vGPU is equal to or greater than the predetermined threshold, the vGPU scheduler 240 may perform context switching to change a vGPU having an access to the GPU 270 from the first vGPU to the second vGPU. Then, when a predetermined amount of the data of the command received by the second vGPU is processed, the vGPU scheduler 240 may perform context switching to process the command received by the first vGPU again. The predetermined amount of data may vary, for example, according to user setting.

The timer monitoring unit (or timer monitor or simply timer) 260 (e.g., circuitry which may dedicated or programmable) according to an example embodiment may recognize a vGPU receiving a command from a BG OS among the OSs 211, 213, and 215. When the vGPU receiving the command from the BG OS is the first vGPU among the plurality of vGPUs 231, 233, and 235, whether a time for which the command received by the first vGPU is not processed is greater than a preset time may be determined. When the timer monitoring unit 260 determines that the time for which the command received by the first vGPU is not processed is greater than the preset time, the first vGPU may inform the BG OS that the predetermined amount of data of the command is processed.

According to an example embodiment, each of the OSs 211, 213, and 215 may include a timer (not shown). The timers may respectively count times for which the commands received by the OSs 211, 213, and 215 are not processed. According to an example embodiment, the timer monitoring unit 260 may determine whether a time counted by a timer of a BG OS is greater than the preset time. Thus, when the timer monitoring unit 260 determines that the time counted by the timer of the BG OS is greater than the preset time, a vGPU receiving a command from the BG OS may inform the BG OS that the predetermined amount of data of the command is processed. Next, the timer of the BG OS may count a time for which another command is not processed.

Since the device 200 includes the vGPU monitoring unit 250, a command buffer of a vGPU corresponding to a BG OS may be prevented from overflowing even when a vGPU corresponding to an FG OS is scheduled to first access the GPU 270.

Also, since the device 200 includes the timer monitoring unit 260, the GPU 270 may be prevented from being reset by a BG OS due to a failure to process a command from the BG OS for a predetermined time even when a vGPU corresponding to an FG OS is scheduled to first access the GPU 270.

Figure 4:
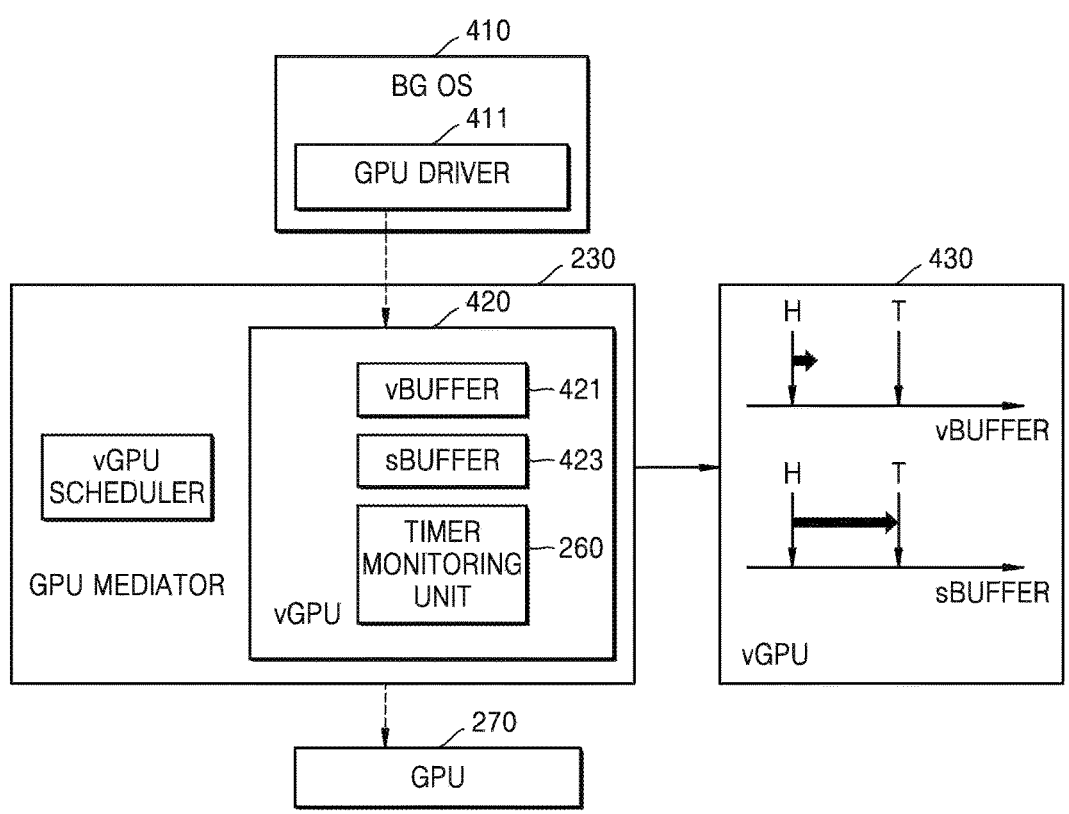
FIG. 4 is a diagram illustrating an operation of a timer monitoring unit according to an example embodiment.

FIG. 4 is a diagram illustrating an operation of the timer monitoring unit 260 according to an example embodiment.

For convenience of explanation, FIG. 4 illustrates only a BG OS 410, a GPU mediator 230, and a GPU 270. The components illustrated in FIG. 3 may also apply to the embodiment of FIG. 4.

The vGPU 420 according to an example embodiment may include a virtual buffer (vbuffer) 421 and a shadow buffer (sbuffer) 423 as command buffers. According to an example embodiment, the vbuffer 421 may receive a command from a GPU driver 411 and store the command. Thus, the vbuffer 421 may indicate the amount of data of a command received from the GPU driver 411 or processed by the GPU 270 so that the amount of data of the command may be recognized by the GPU driver 411. According to an example embodiment, the sbuffer 423 may indicate the amount of data of a command received from the GPU driver 411 or processed by the GPU 270 so that the amount of data of the command may be recognized by the vGPU 420. The amount of data of the command may, for example, be represented by the distance between a head H and a tail T as shown in a region 430 of FIG. 4. The vGPU 420 performs updating to move the head H to the right when a command is processed and thus the amount of data of the command decreases, and performs updating to move the tail T to the right when a command is received from the GPU driver 411. According to an example embodiment, the vbuffer 421 and the sbuffer 423 may be ring buffers employing a ring architecture that enables a CPU and a GPU to share cache memory resources and to efficiently exchange data with each other.

The timer monitoring unit 230 according to an example embodiment may determine whether a time counted by a timer of the BG OS 410 is greater than a preset time. When the timer monitoring unit 230 determines that the time counted by the timer of the BG OS 410 is greater than the preset time, the vGPU 420 may perform updating to move a head of the vbuffer 421 to the right by a predetermined length.

According to an example embodiment, when the vGPU 420 processes all of commands via the GPU 270, the vGPU 420 may perform updating to move a head of the sbuffer 423 to the location of the tail as shown in the region 430. When the timer monitoring unit 230 determines that the time counted by the timer of the BG OS 410 is greater than the preset time, the vGPU 420 may perform updating to move the head of the vbuffer 421 to the right by the predetermined length as shown in the region 430. Thus, the vGPU 420 may inform the BG OS 410 that an amount of processed data is less than an amount of actually processed data of a command. Thus, the BG OS 410 may recognize the performance of the GPU 270 to be low.

Figure 5:
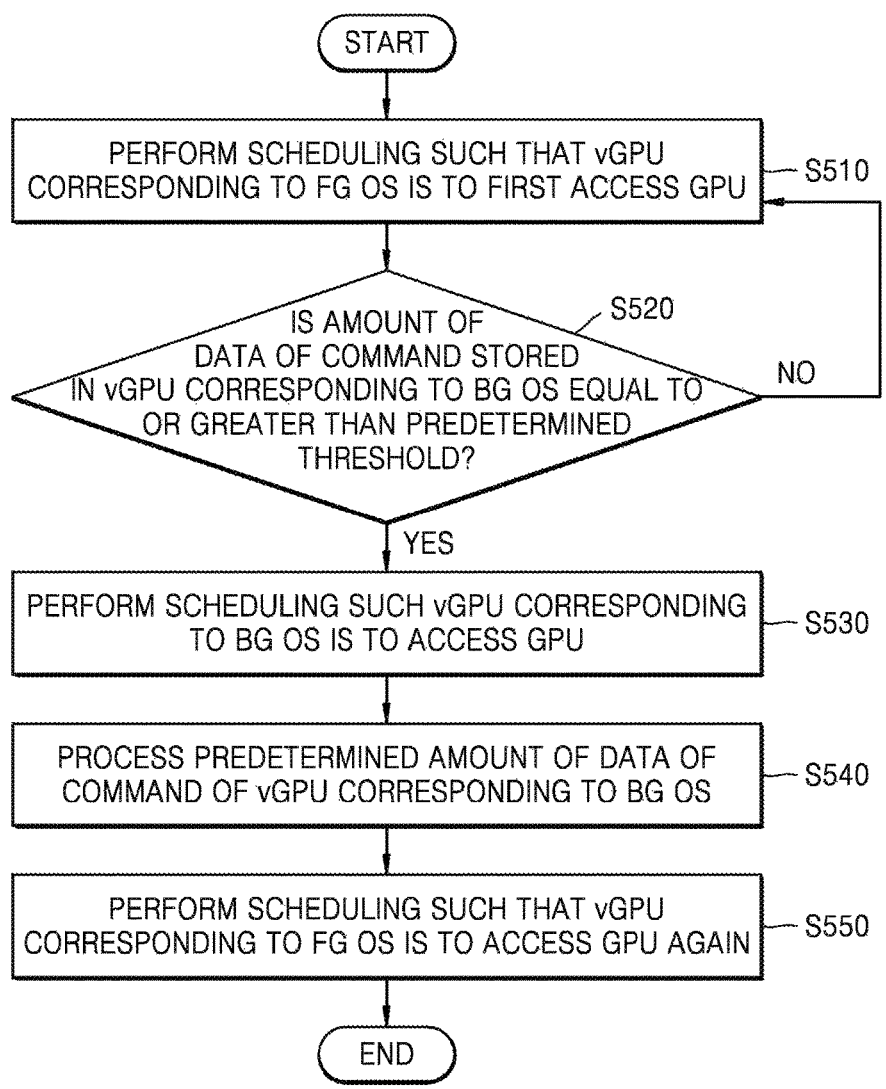
FIG. 5 is a flowchart of a method of performing scheduling for a plurality of vGPUs, the method being performed by a device, according to an example embodiment.

FIG. 5 is a flowchart of a method of performing scheduling for a plurality of vGPUs, performed by the device 200 of FIG. 3, according to an example embodiment.

The method of FIG. 5 may be performed by the components of the device 200 of FIG. 3 and thus parts of the method of FIG. 5 that are the same as those of the device 200 described above are not described again here.

In operation S510, the device 200 may perform scheduling such that a vGPU corresponding to an FG OS will first access a GPU. According to an example embodiment, the device 200 may be set such that only a vGPU receiving a command from the FG OS may access the GPU and process the command.

In operation S520, the device 200 may determine whether the amount of data of a command stored in a vGPU corresponding to a BG OS is greater than a predetermined threshold. The device 200 may monitor a command buffer of the vGPU corresponding to the BG OS to determine whether the amount of data of the command stored in the command buffer is greater than the predetermined threshold.

When in operation S520, the device 200 determines that the amount of data of the command stored in the vGPU corresponding to the BG OS is less than the predetermined threshold, the device 200 may perform scheduling such that the vGPU corresponding to an FG OS will continuously access the GPU.

When in operation S520, the device 200 determines that the amount of data of the command stored in the vGPU corresponding to the BG OS is equal to or greater than the predetermined threshold, the device 200 may perform scheduling such that the vGPU corresponding to the BG OS will access the GPU (operation S530). According to an example embodiment, the device 200 may perform context switching to change a vGPU having an access to the GPU from the vGPU corresponding to the FG OS to the vGPU corresponding to the BG OS.

In operation S540, the device 200 may process a predetermined amount of data of the command stored in the vGPU corresponding to the BG OS. The predetermined amount of data may vary, for example, according to user setting.

In operation S550, the device 200 may perform scheduling such that the vGPU corresponding to the FG OS will access the GPU again. That is, the device 200 may perform context switching to change a vGPU having an access to the GPU from the vGPU corresponding to the BG OS to the vGPU corresponding to the FG OS.

According to an example embodiment, the device 200 may repeatedly perform operations S510 to S550.

Figure 6:
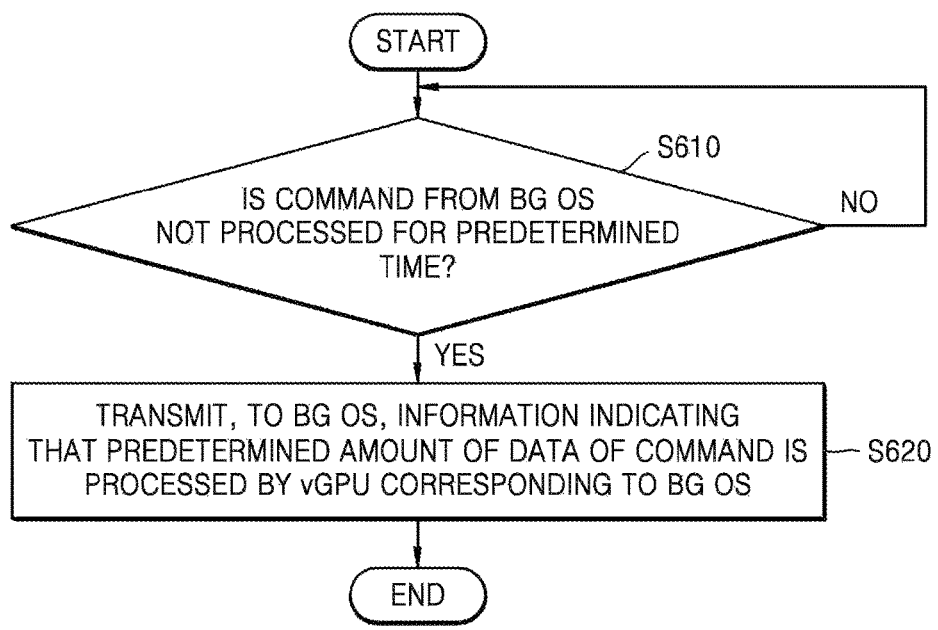
FIG. 6 is a flowchart of a method of performing scheduling for a plurality of vGPUs, the method being performed by a device, according to another example embodiment.

FIG. 6 is a flowchart of a method of performing scheduling for a plurality of vGPUs, performed by the device 200 of FIG. 3, according to another example embodiment.

The method of FIG. 6 may be performed by the components of the device 200 of FIG. 3 and thus parts of the method of FIG. 6 that are the same as those of the device 200 of FIG. 3 described above are not described again here.

In operation S610, the device 200 according to an example embodiment may determine whether a command from a BG OS is not processed for a predetermined time. According to an example embodiment, the device 200 may determine whether a time counted by a timer of the BG OS is greater than a preset time. The timer counts a time for which the command from the BG OS is not processed. When in operation S610, the device 200 determines that the command from the BG OS is processed for the predetermined time, the timer may resume counting, starting from a point of time when the processing of the command from the BG OS is completed.

In operation S620, when in operation S610, the device 200 determines that the command from the BG OS is not processed for the predetermined time, the device 200 may control a vGPU corresponding to the BG OS to transmit information indicating that a predetermined amount of data of the command is processed to the BG OS. The predetermined amount of data may be set to be less than an actual amount of data of the command processed by the vGPU.

Figure 7:
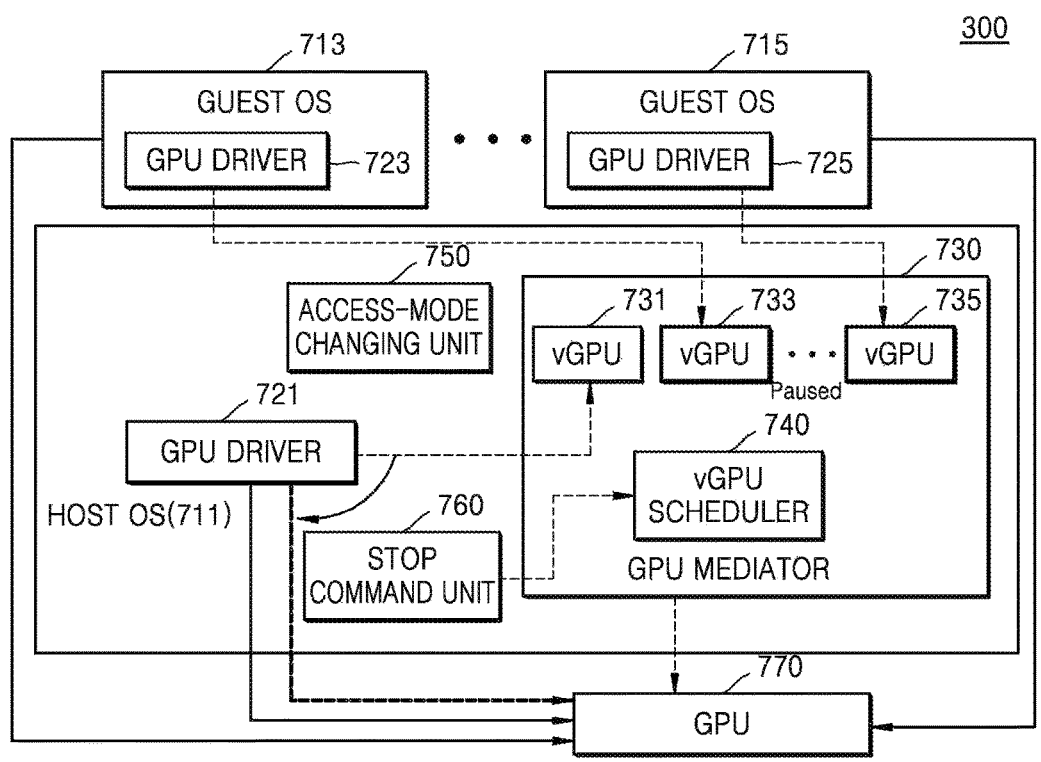
FIG. 7 is a block diagram of a device according to another example embodiment.

FIG. 7 is a block diagram of a device 300 according to another example embodiment.

The device 300 according to an example embodiment may include a plurality of OSs 711, 713, and 715, a GPU 770, a GPU mediator 730, a stop command unit 760, and an access-mode changing unit 750. Only components of the device 300 that are related to the present embodiment are illustrated in FIG. 7. It will be readily apparent to those of ordinary skill in the art that the device 300 may further include other general components in addition to the components illustrated in FIG. 7. The plurality of OSs 711, 713, and 715, the GPU 770, and the GPU mediator 730 of FIG. 7 should be understood based on the above description related to FIG. 3 and thus descriptions thereof that are the same as those of FIG. 3 are not described again here.

The stop command unit 760 (e.g., circuitry which may dedicated or programmable) according to an example embodiment may determine whether an FG OS is a host OS 711. When the FG OS is the host OS 711, the stop command unit 760 may control a vGPU scheduler 740 to exclude vGPUs 733 and 735 receiving commands from guest OSs from objects to be scheduled. Thus, the vGPU scheduler 740 may perform scheduling only for a vGPU corresponding to the host OS 711 by using the stop command unit 760.

Also, the stop command unit 760 according to an example embodiment may control a virtualized central processing unit (vCPU) (not shown) corresponding to the guest OSs 723 and 725 to be stopped.

The access-mode changing unit 750 (e.g., circuitry which may dedicated or programmable) according to an example embodiment may change an object that is to receive a command from the host OS 711 from a vGPU 731 to the GPU 770. According to an example embodiment, the access-mode changing unit 750 may control a command, which is to be transmitted to the vGPU 731 from a GPU driver 721, to be transmitted to the GPU 770. That is, the access-mode changing unit 750 may perform switching from a mode in which the host OS 711 indirectly accesses the GPU 770 via the GPU mediator 730 to a mode in which the host OS 722 directly accesses the GPU 770. Also, according to an example embodiment, the access-mode changing unit 750 may perform switching from the mode in which the host OS 711 directly accesses the GPU 770 to the mode in which the host OS 711 indirectly accesses the GPU 770 via the GPU mediator 730.

Since the device 300 includes the stop command unit 760, the performance of a GPU driven by the host OS 711 which is an FG OS may be controlled to be substantially the same as a native performance. Also, since the device 300 includes the access-mode changing unit 750, the performance of a GPU driven by the host OS 711 which is an FG OS may be controlled to be substantially the same as the native performance. Native performance refers to a performance of the GPU achieved when only the host OS 711 is present in the device 300 and thus the GPU is driven only and directly by the host OS 711.

Figure 8A:
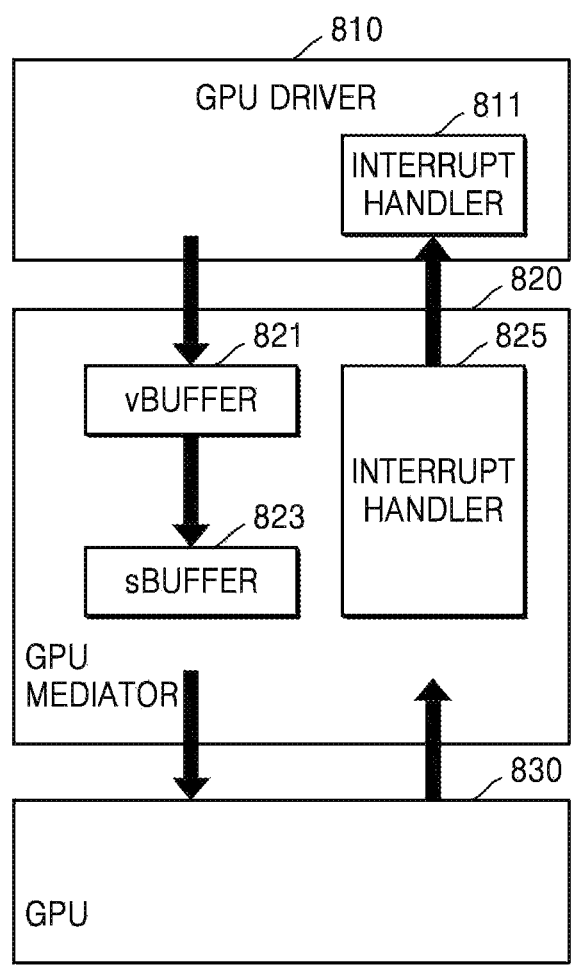
FIGS. 8A and 8B are diagrams illustrating mode changing from an indirect access mode to a direct access mode, the mode changing being performed by an access-mode changing unit, according to an example embodiment.
Figure 8B:
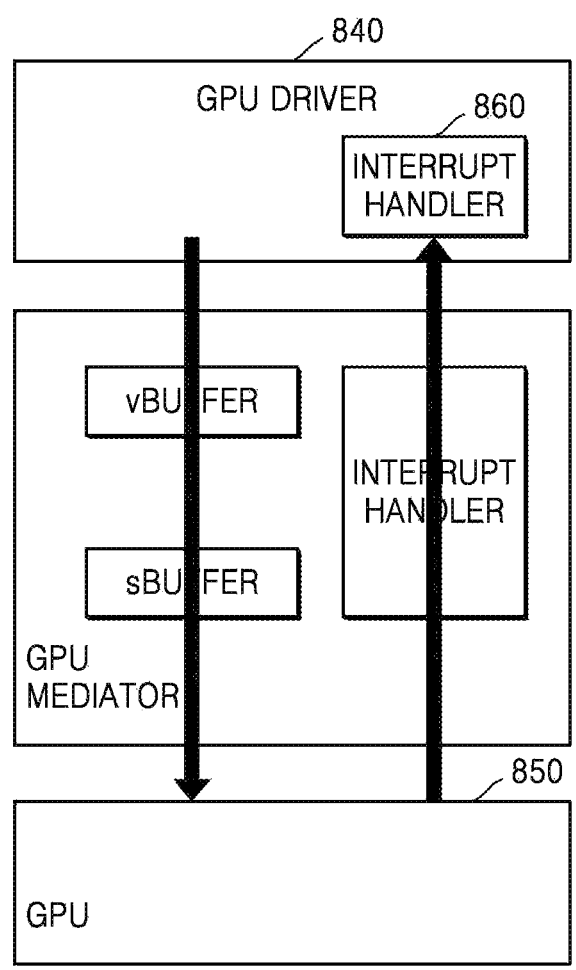

FIGS. 8A and 8B are diagrams illustrating mode changing from an indirect access mode to a direct access mode, performed by the access-mode changing unit 750, according to an example embodiment.

FIG. 8A illustrates the indirect access mode and FIG. 8B illustrates the direct access mode according to an example embodiment.

Referring to FIG. 8A, a GPU driver 810 may transmit a command to a vbuffer 821 of a GPU mediator 820. Next, the GPU mediator 820 may store the command, which is stored in the vbuffer 821, in an sbuffer 823, and transmit the command stored in the sbuffer 823 to a GPU 830. Also, the GPU 830 may transmit an interrupt signal to an interrupt handler 825 included in the GPU mediator 820, and then the GPU mediator 820 may transmit the interrupt signal to an interrupt handler 811 included in the GPU driver 810.

Referring to FIG. 8B, a GPU driver 840 may directly transmit a command to a GPU 850. The GPU 850 may directly transmit an interrupt signal to an interrupt handler 860 included in the GPU driver 840.

Figure 9:
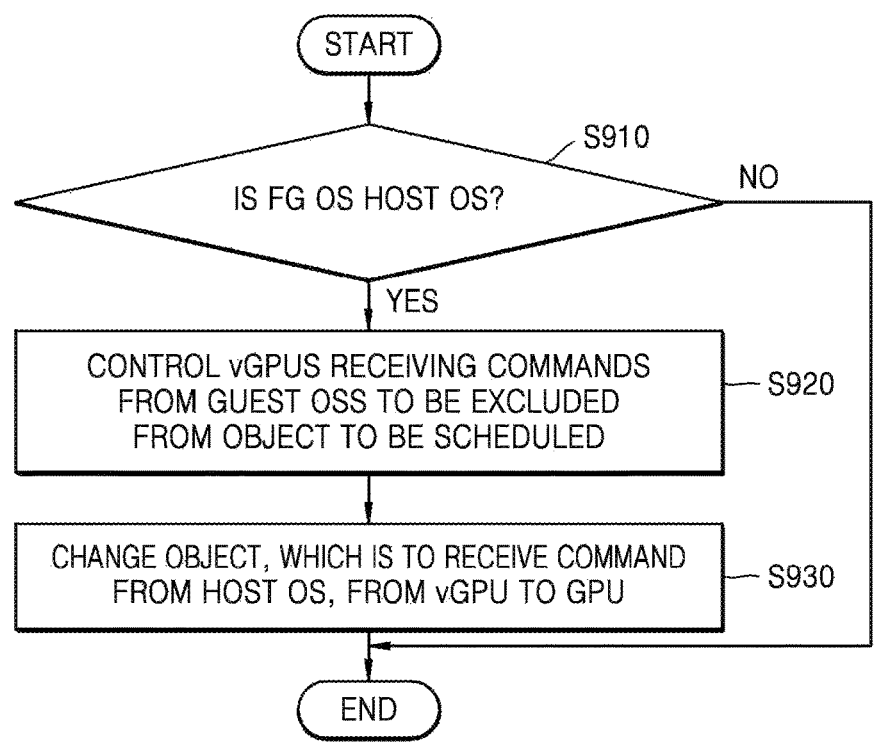
FIG. 9 is a flowchart of a method of performing scheduling for a plurality of vGPUs, the method being performed by a device, according to another example embodiment.

FIG. 9 is a flowchart of a method of performing scheduling for a plurality of vGPUs, performed by the device 300 of FIG. 7, according to another example embodiment.

The method of FIG. 9 may be performed by the components of the device 300 of FIG. 7 and thus parts of the method of FIG. 9 that are the same as those of the device 300 described above are not described again here.

In operation S910, the device 300 may determine whether an FG OS is a host OS.

In operation S920, when it is determined in operation S910 that the FG OS is a host OS, the device 300 may control vGPUs receiving commands from guest OSs to be excluded from objects to be scheduled. That is, the device 300 may perform scheduling only for a vGPU receiving a command from the host OS. Also, the device 300 according to an example embodiment may control vCPUs corresponding to the guest OSs to be stopped.

In operation S930, the device 300 may change an object that will receive a command from the host OS from a vGPU to a GPU. According to an example embodiment, the device 300 may control a command, which is to be transmitted to a vGPU from a GPU driver, to be transmitted to the GPU. That is, the device 300 may perform mode changing from the indirect access mode in which the host OS indirectly accesses the GPU via the GPU mediator to the direct access mode in which the host OS directly accesses the GPU. Also, according to an example embodiment, the device 300 may perform mode changing from the direct access mode in which the host OS directly accesses the GPU to the indirect access mode in which the host OS indirectly accesses the GPU via the GPU mediator.

Figure 10:
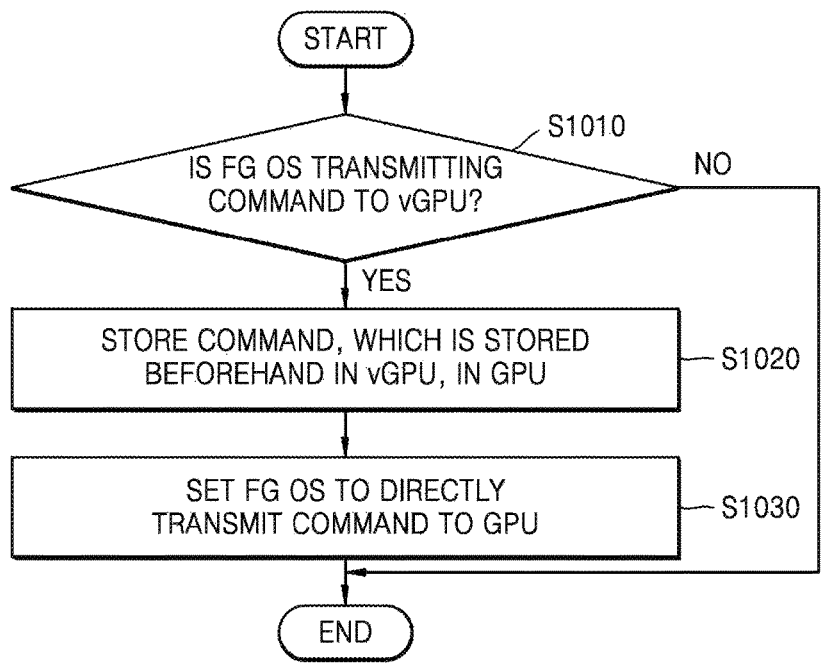
FIG. 10 is a diagram illustrating mode changing from the indirect access mode to the direct access mode, the mode changing being performed by a device, according to another example embodiment.

FIG. 10 is a diagram illustrating mode changing from the indirect access mode to the direct access mode, performed by the device 300 of FIG. 7, according to another example embodiment.

The method of FIG. 10 may be performed by the components of the device 300 of FIG. 7 and thus parts of the method of FIG. 10 that are the same as those of the device 300 described above are not described again here.

In operation S1010, the device 300 may determine whether an FG OS is transmitting a command to a vGPU.

In operation S1020, when it is determined in operation S1010 that the FG OS is transmitting the command to the vGPU, the device 300 according to an example embodiment may store a command stored beforehand in the vGPU in a GPU.

In operation S1030, the device 300 may control the FG OS to directly transmit the command to the GPU. Also, the device 300 may control an interrupt signal from the GPU to be received by a GPU driver.

Figure 11:
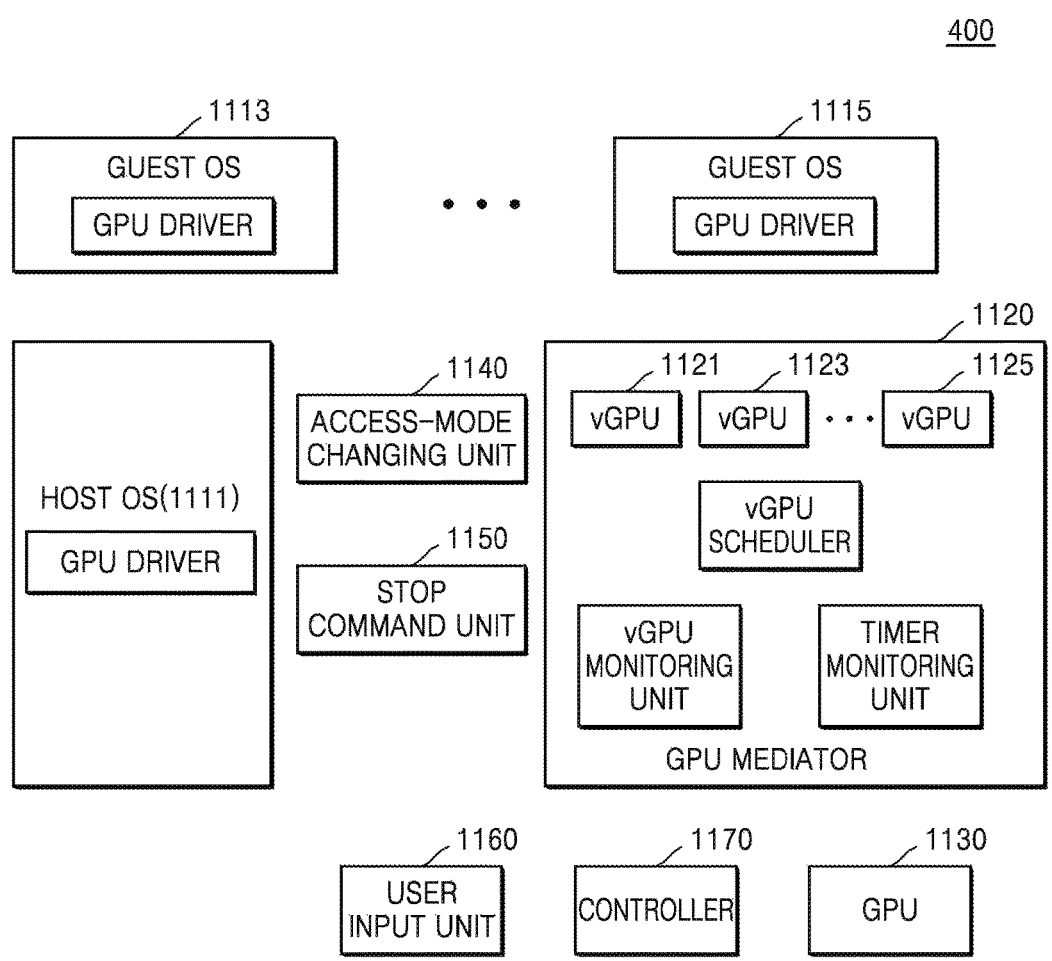
FIG. 11 is a block diagram of a device according to another example embodiment.

FIG. 11 is a block diagram of a device 400 according to another example embodiment.

The device 400 according to an example embodiment may include a plurality of OSs 1111, 1113, and 1115, a GPU 1130, a GPU mediator 1120, a stop command unit 1150, an access-mode changing unit 1140, a controller 1170, and a user input unit or device 1160. FIG. 11 illustrates only components of the device 400 which are related to the present embodiment. It will be readily apparent to those of ordinary skill in the art that the device 400 may further include other general components in addition to the components illustrated in FIG. 11.

Some parts of the plurality of OSs 1111, 1113, and 1115, the GPU 1130, the GPU mediator 1120, the access-mode changing unit 1140, and the stop command unit 1150 of FIG. 11 are as described above with reference to FIGS. 1, 3, and 7 and are thus not described again here.

The controller 1170 according to an example embodiment may control a menu regarding a scheduling mode for determining an order in which and times for which a plurality of vGPUs 1121, 1123, and 1125 will access the GPU 1130 to be displayed on a screen. That is, the controller 1170 according to an example embodiment may control a menu via which a user may select a scheduling mode to be displayed on the screen. According to an example embodiment, the scheduling mode may include at least one among a general scheduling mode which is set as a default mode, an FG-oriented mode in which a vGPU receiving a command from an FG OS is set to first access the GPU 1130 and to process the command, a BG stop mode in which a vGPU corresponding to a BG OS is excluded from an object to be scheduled when an FG OS is a host OS, a direct access mode in which a command from an FG OS is directly transmitted to the GPU 1130, and an indirect access mode in which a command from an FG OS is transmitted to the GPU 1130 via the GPU mediator 1120.

When a screen is divided into a plurality of regions, the controller 1170 according to an example embodiment may control a menu for selecting a scheduling mode for an OS to be executed in each of the plurality of regions to be displayed on the screen. For example, when the screen is divided into a first region and a second region, the controller 1170 may control a menu for selecting a ratio between a time for which a vGPU corresponding to an OS to be executed in the first region may access the GPU 1130 and a time for which a vGPU corresponding to an OS to be executed in the second region may access the GPU 1130 to be displayed on the screen. Also, the controller 1170 according to an example embodiment may control the menu for selecting the general scheduling mode, the FG-oriented mode, the BG stop mode, the direct access mode, or the indirect access mode with respect to each of the first region and the second region to be displayed on the screen.

The user input unit 1160 may receive a user input for selecting one of the scheduling modes displayed on the screen. Although not shown, the user input unit 1160 may include a device via which a specific input is received from the outside, and so on. For example, examples of the user input unit 1160 may include a microphone, a keyboard, a mouse, a joystick, a touch pad, a touch pen, a voice and gesture recognition device, etc. When a user input for selecting a scheduling mode is received via the user input unit 1160, the controller 1160 may control the device 400 to be operated according to the selected scheduling mode.

Figure 12:
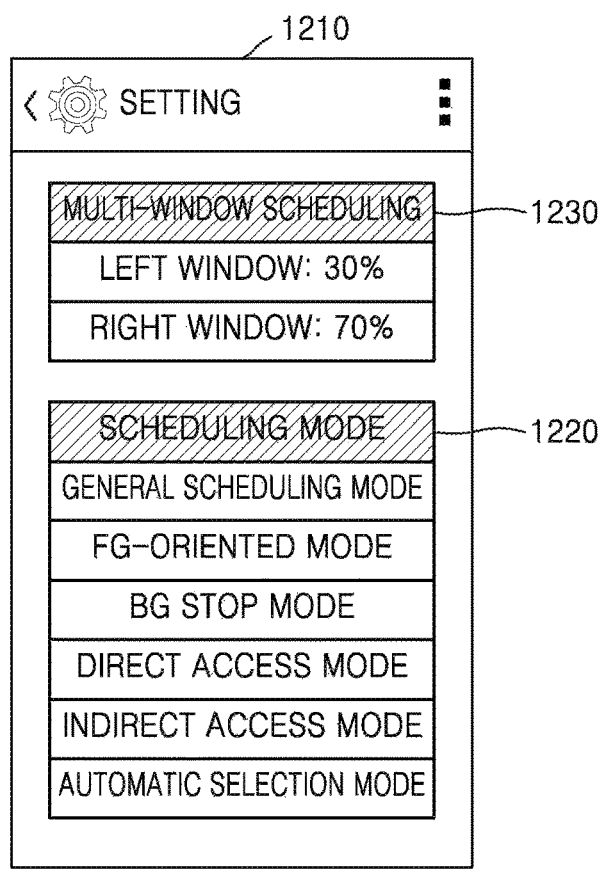
FIG. 12 is a diagram illustrating a method of displaying, on a screen, a menu for selecting a scheduling mode, the method being performed by a device, according to an example embodiment.

FIG. 12 illustrates a method of displaying, on a screen 1210, a menu 1220 for selecting a scheduling mode, performed by the device 400 of FIG. 11, according to an example embodiment.

Referring to FIG. 12, the device 400 may display on the screen 1210 the menu 1220 for selecting one scheduling mode among the general scheduling mode, the FG-oriented mode, the BG stop mode, the direct access mode, the indirect access mode, and an automatic selection mode. The automatic selection mode means a mode in which a scheduling mode is selected by the device 400 as predetermined according to a circumstance. For example, the automatic selection mode may be set such that the FG-oriented mode and the BG stop mode are automatically selected when a residual capacity a battery of the device 400 is less than or equal to a predetermined level. Thus, the user input unit 1160 may receive a user input for selecting one scheduling mode among the scheduling modes displayed on the screen 1210, and the controller 1170 may control the device 400 to be operated according to the selected scheduling mode.

Also, when the screen 1210 displayed on the device 400 is divided into multiple window regions, the device 400 may display a menu 1230 for selecting a ratio between times for which vGPUs corresponding to OSs to be respectively executed in the multiple window regions may access a GPU. Referring to the screen 1210, 30% and 70% may be respectively received, via the user input unit 1160, for a left window and a right window as a ratio between times for which the GPU will be accessed. The controller 1170 may control the device 400 to be operated at the ratio.

The shapes or types of the menus 1220 and 1230 displayed on the screen 1210 are not limited to those illustrated in FIG. 12 and may be differently arranged.

Figure 13A:
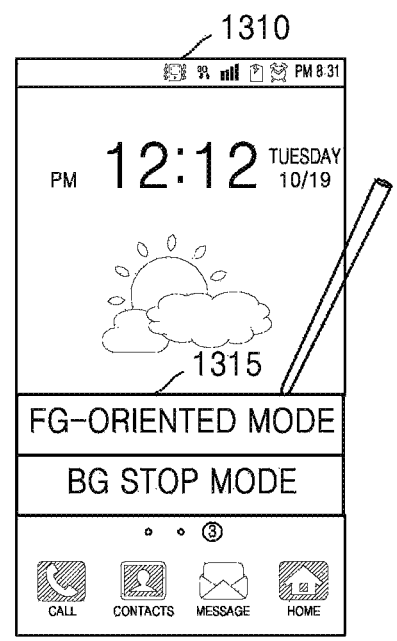
FIGS. 13A and 13B are diagrams illustrating a method of displaying, on a screen, a menu for selecting a scheduling mode, the method being performed by a device, according to another example embodiment.
Figure 13B:
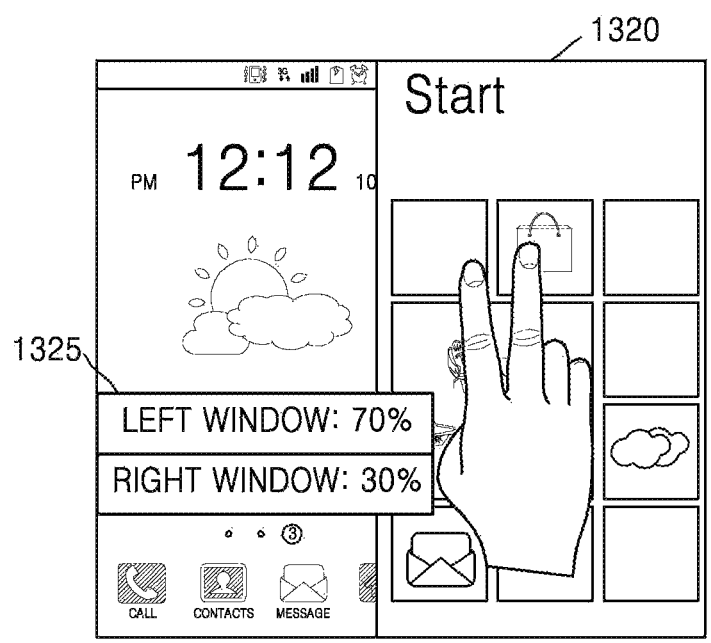

FIGS. 13A and 13B are diagrams illustrating a method of displaying, on a screen, a menu for selecting a scheduling mode, performed by the device 400 of FIG. 11, according to another example embodiment.

Referring to FIG. 13A, a user may perform a double-click input on a screen 1310 displayed on the device 400 by using a pen, stylus or other pointing device. The controller 1170 may control a menu 1315 for selecting the FG-oriented mode and the BG stop mode as scheduling modes to be displayed on the screen 1310 in response to the double-click input. Then, the user input unit 1160 may receive a user input for selecting the FG-oriented mode or the BG stop mode by using a clicking method or the like, and the controller 1170 may control the device 400 to be operated according to the selected scheduling mode. A method in which a user performs an input on the screen 1310 and a method in which the controller 1170 displays the menu 1315 on the screen 1310 are not limited to those illustrated in FIG. 13(a) and may be performed differently.

Referring to FIG. 13B, a user may perform an input by simultaneously touching points on a screen 1320, which is displayed on the device 400 and divided into two regions, with his or her two fingers. The controller 1170 may display a menu 1325 for selecting, as multi-window scheduling, a ratio between times for which commands from OSs to be respectively executed in the left and right windows will be processed by a GPU according to a user input. Next, the ratio between the times of the left and right windows may be received from a user via the user input unit 1160. The controller 1170 may control the device 400 to be operated according to the received ratio. A method in which a user performs an input on the screen 1320 and a method in which the controller 1170 displays the menu 1325 on the screen 1320 are not limited to those illustrated in FIG. 13B and may be performed differently.

Figure 14:
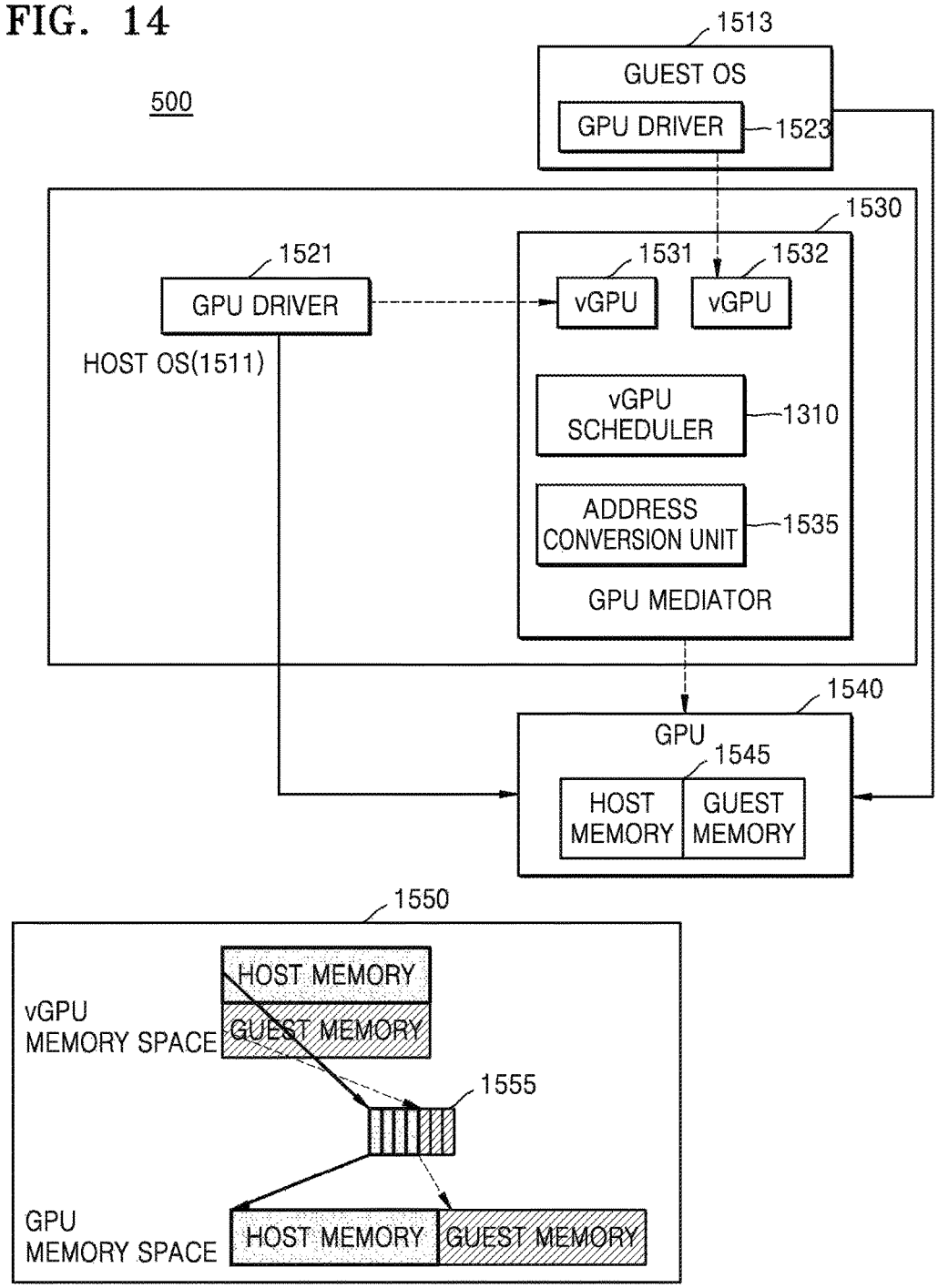
FIG. 14 is a block diagram of a device according to another example embodiment.

FIG. 14 is a block diagram of a device 500 according to another example embodiment.

The device 500 according to an example embodiment may include a host OS 1511, a guest OS 1513, a GPU 1540, and a GPU mediator 1530. FIG. 14 illustrates only components of the device 500 that are related to the present embodiment. It will be readily apparent to those of ordinary skill in the art to which the present embodiment pertains that the device 500 may further include other general components in addition to the components illustrated in FIG. 14.

Some parts of the host OS 1511, the guest OS 1513, the GPU 1540, and the GPU mediator 1530 of FIG. 14 are as described above with reference to FIGS. 1 and 3, and are not thus described again here.

The GPU 1540 according to an example embodiment may include a memory 1545. The memory 1545 may be divided into a plurality of spaces according to the total number of the host OS 1511 and the guest OS 1513. That is, when the host OS 1511 and the guest OS 1513 are present in the device 500, the memory 1545 may be divided into a memory space (host memory space) for the host OS 1511 and a memory space (guest memory space) for the guest OS 1513.

An address conversion unit (or address converter) 1535 (e.g., circuitry which may dedicated or programmable) according to an example embodiment may convert an address value that the host OS 1511 or the guest OS 1513 uses to access a memory of a vGPU 1531 or 1532 into an address value that the vGPU 1531 or 1532 uses to access the memory 1545 of the GPU 1540. According to an example embodiment, when the host OS 1511 accesses the memory of the vGPU 1531 by using a first address value, the address conversion unit 1535 may convert the first address value into a second address value that the vGPU 1531 uses to access the host memory space of the memory 1545 of the GPU 1540. Also, the address conversion unit 1535 may control the vGPU 1531 to access the memory 1545 by using the second address value.

The address conversion unit 1535 according to an example embodiment may read information regarding the size of the memory 1545, based on setting information of the GPU 1540. For example, the setting information may be a base address register (BAR) size of peripheral component interconnect (PCI) configuration. Also, the address conversion unit 1535 may calculate the sizes of memories respectively allocated to OSs based on the size of the memory 1545 and the total number of the OSs, and provide information regarding the calculated sizes of the memories to the OSs. For example, the address conversion unit 1535 may read information indicating that the size of the memory 1545 is '100', and provide the guest OS 1513 ad the host OS 1511 with information indicating that the sizes of memories respectively allocated to the guest OS 1513 and the host OS 1511 are each '50'. Also, according to an example embodiment, the address conversion unit 1535 may store, in a predetermined buffer, information regarding the sizes of the memories respectively allocated to the OSs, and each of the OSs may read the information stored in the predetermined buffer.

According to an example embodiment, the address conversion unit 1535 may search a table for the address value that the vGPU 1531 or the 1532 uses to access the memory 1545 of the GPU 1540 and that corresponds to the address value that the host OS 1511 or the guest OS 1513 uses to access the memory of the vGPU 1531 or 1532. In a region 1550 of FIG. 14, a table 1555 maps a vGPU memory space and a GPU memory space to each other. For example, address values '0' to '99' may be assigned to the memory 1545, address values '0' to '49' may be assigned to the host memory space in the memory 1545, and address values '50' to '99' may be assigned to the guest memory space in the memory 1545. When the host OS 1511 and the guest OS 1513 are to respectively access the memory spaces of the vGPUs 1531 and 1532 by using the address values '0' to '49', the address conversion unit 1535 may control the host OS 1511 to access the memory 1545 by using the address values '0' to '49' and the guest OS 1513 to access the memory 1545 by using the address values '50' to '99', based on the table 1555.

According to an example embodiment, the address conversion unit 1535 may determine whether the host OS 1511 or the guest OS 1513 accesses the memory 1545 by using address values that are not in a predetermined range. The predetermined range may be a range of address values of memories assigned to each of the vGPUs 1531 and 1532. According to an example embodiment, when the host OS 1511 or the guest OS 1513 accesses the memory 1545 by using address values that are not in the predetermined range, the address conversion unit 1535 may inform the host OS 1511 or the guest OS 1513 of an access failure.

Since the device 500 includes the address conversion unit 1535, full-virtualization that does not require modification of code of a GPU driver may be realized.

Figure 15:
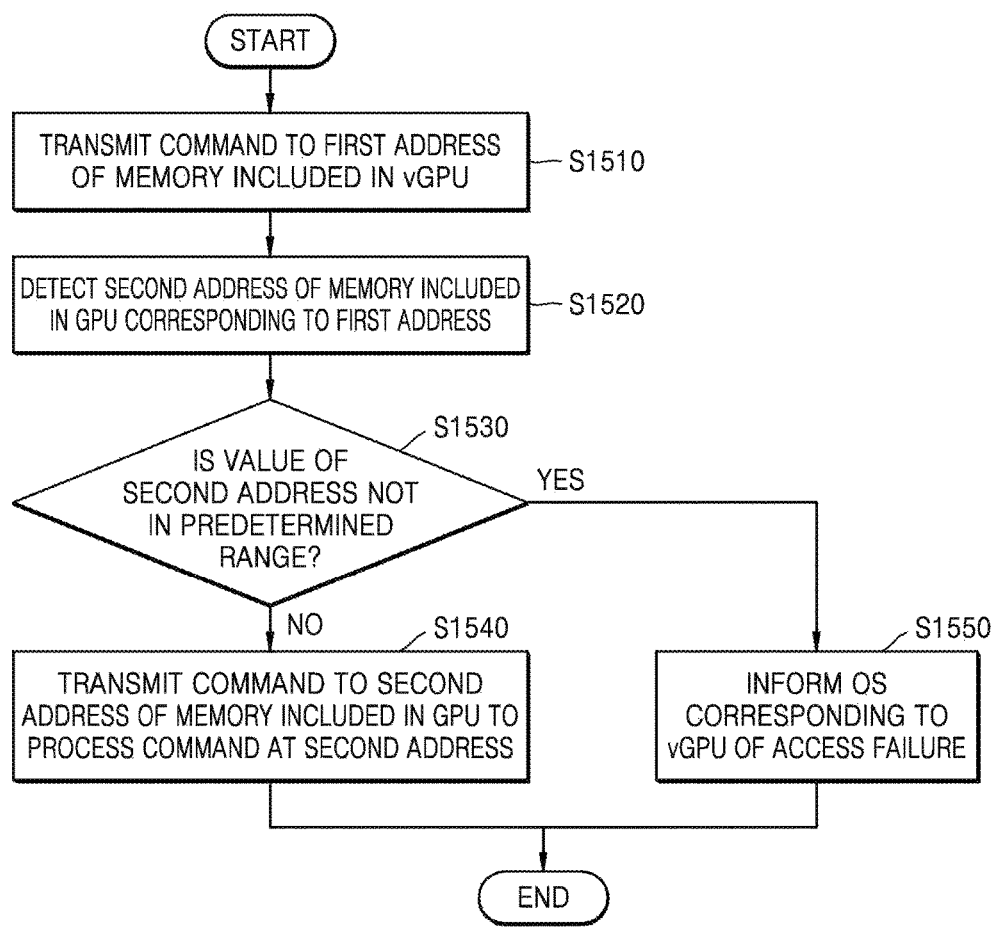
FIG. 15 is a flowchart of a method of performing address conversion, the method being performed by a device, according to an example embodiment.

FIG. 15 is a flowchart of a method of performing address conversion, performed by the device 500 of FIG. 14, according to an example embodiment.

The method of FIG. 15 may be performed by the components of the device 500 of FIG. 14 and thus parts thereof that are the same as those of the device 500 described above are not described gain here.

In operation S1510, the device 500 according to an example embodiment may transmit a command to a first address of a memory of a vGPU.

In operation S1520, the device 500 according to an example embodiment may detect a second address of a memory of a GPU which corresponds to the first address. The device 500 may detect the second address of the memory of the GPU corresponding to the first address, based on a table mapping a memory space of the vGPU and a memory space of the GPU to each other.

In operation S1530, the device 500 according to an example embodiment may determine whether the value of the second address is not in a predetermined range. The predetermined range may be a range of an address value of the memory corresponding to the vGPU.

In operation S1540, when in operation S1530, the device 500 determines that the second address value is in the predetermined range, the device 500 may transmit a command to the second address of the memory of the GPU.

In operation S1550, when in operation S1530, the device 500 determines that the value of the second address is not in the predetermined range, the device 500 may inform an OS corresponding to the vGPU of an access failure.

The devices according to one or more of the above example embodiments may include a processor, a memory for storing and executing program data, a permanent storage such as a disk drive, a communication port for communicating with an external device, a user interface device such as a touch panel, keys, buttons, etc. Methods that may be embodied as software modules or algorithms may be stored in a computer-readable recording medium in the form of computer-readable codes or program instructions that can be executed in the processor. Examples of the computer-readable recording medium include a magnetic recording medium (e.g., read-only memory (ROM), random-access memory (RAM), a floppy disk, a hard disc, etc.), an optical recording medium (e.g., compact-disk ROM (CD-ROM), a digital versatile disc ((DVD)), and so on. The computer-readable medium can be distributed among computer systems that are interconnected through a network, and an example embodiment may be stored and implemented as computer-readable code in a distributed manner. Data stored on the computer-readable recording medium can be read by a computer, stored in a memory, and executed by a processor.

Example embodiments may be represented using functional block components and various operations. Such functional blocks may be realized by any number of hardware and/or software components configured to perform specified functions. For example, example embodiments may employ various integrated circuit components, e.g., memory, processing elements, logic elements, look-up tables, and the like, which may carry out a variety of functions under control of at least one microprocessor or other control devices. If elements of example embodiments are implemented using software programming or software elements, example embodiments may be implemented with any programming or scripting language such as C, C++, Java, assembler, or the like, including various algorithms that are any combination of data structures, processes, routines or other programming elements. Functional aspects may be realized as an algorithm executed by at least one processor. Furthermore, example embodiments may employ conventional techniques for electronics configuration, signal processing and/or data processing. The terms 'mechanism', 'element', 'means', 'configuration', etc. are used broadly and are not limited to mechanical or physical embodiments. These terms should be understood to include software routines in conjunction with processors, etc.

The particular implementations shown and described herein are example embodiments and are not intended to otherwise limit the scope of the inventive concept in any way. For the sake of brevity, conventional electronics, control systems, software development and other functional aspects of the systems may not be described in detail. Furthermore, the lines or connecting elements shown in the appended drawings are intended to represent example functional relationships and/or physical or logical couplings between the various elements. It should be noted that many alternative or additional functional relationships, physical connections or logical connections may be present in a practical device.

The use of the terms 'a', 'an', and 'the' and similar referents in the context of describing the concepts disclosed herein (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein can be performed in an appropriate order unless otherwise indicated herein or otherwise clearly contradicted by context. The disclosed concepts are not limited by an order in which the operations are described herein. The use of any and all examples, or example language (e.g., "such as") provided herein, is intended merely to clearly describe the disclosed concepts and does not impose a limitation on the scope of the disclosed concepts unless otherwise claimed. Numerous modifications and adaptations will be readily apparent to those skilled in this art without departing from the spirit and scope of the disclosed concepts.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A device including a physical graphics processing unit (GPU), the device comprising:
   a plurality of virtual GPUs (vGPUs), realized from the physical GPU, configured to respectively receive commands from a plurality of operating systems (OSs);
   a vGPU scheduler configured to schedule an order and times for processing of the received commands by the GPU; and
   a controller configured to control display on a screen of a menu for selecting a scheduling mode in which the order and times are to be scheduled,
   wherein the vGPU scheduler is further configured to schedule the order and times such that a command from a foreground OS (FG OS) among the plurality of OSs is scheduled to be processed first, and
   wherein the scheduling mode comprises at least one among a general scheduling mode, a FG-oriented mode, a background (BG) stop mode, a direct access mode, and an indirect access mode.

2. The device of claim 1, further comprising a vGPU monitor configured to determine whether an amount of data of a command received by a first vGPU among the plurality of vGPUs is equal to or greater than a threshold when the first vGPU receives the command from a background OS (BG OS) among the plurality of OSs.

3. The device of claim 2, wherein, when the vGPU monitor determines that the amount of the data of the command received by the first vGPU is equal to or greater than the threshold, the vGPU scheduler is further configured to schedule the order and times such that the command received by the first vGPU is scheduled to be processed by the GPU.

4. The device of claim 1, further comprising a timer monitor configured to determine whether a time for which a command received by a first vGPU among the plurality of vGPUs is not processed is greater than a preset time when the first vGPU receives the command from a background OS (BG OS) among the plurality of OSs.

5. The device of claim 4, wherein, when the timer monitor determines that the time for which the command received by the first vGPU is not processed is greater than the preset time, the first vGPU is further configured to inform the BG OS that a predetermined amount of data of the command is processed.

6. The device of claim 1, further comprising a stop command controller configured to control the vGPU scheduler to exclude commands from the plurality of OSs except for commands from a host OS from an object to be scheduled when the FG OS is the host OS.

7. The device of claim 6, further comprising an access-mode changing controller configured to change an object, which is to receive a command from the host OS, from a first vGPU among the plurality of vGPUs to the GPU when the first vGPU receives a command from the host OS.

8. The device of claim 1, further comprising:
   a user input device configured to receive a user input for selecting the scheduling mode through the displayed menu.

9. The device of claim 8, wherein the vGPU scheduler is further configured to schedule the order and times based on the scheduling mode selected according to the user input.

10. The device of claim 1, further comprising an address converter, wherein when a first OS among the plurality of OSs transmits a command to a first address of a memory included in a first vGPU among the plurality of vGPUs, the address converter is configured to convert the first address to a second address for accessing a memory of the GPU so as to control the command to be processed at the second address of the memory of the GPU.

11. A method of performing scheduling for a plurality of virtualized graphics processing units (vGPUs) realized from a physical GPU, the method comprising:
   receiving, by the plurality of vGPUs, commands from a plurality of operating systems (OSs);
   scheduling an order in which and times for which the commands are to be processed by a GPU;
   displaying, on a screen, a menu for selecting a scheduling mode in which the order and times are scheduled,
   wherein the scheduling of the order and times comprises scheduling the order and times such that a command from a foreground OS (FG OS) among the plurality of OS is scheduled to be processed first, and
   wherein the scheduling mode comprises at least one among a general scheduling mode, a FG-oriented mode, a background (BG) stop mode, a direct access mode, and an indirect access mode.

12. The method of claim 11, wherein the scheduling of the order and times comprises:
   when a first vGPU among the plurality of vGPUs receives a command from a background OS (BG OS) among the plurality of OSs, determining whether an amount of data of the command received by the first vGPU is equal to or greater than a threshold; and
   when it is determined that the amount of the data of the command received by the first vGPU is equal to or greater than the threshold, the order and times are scheduled such that the command received by the first vGPU is scheduled to be processed by the GPU.

13. The method of claim 11, wherein the scheduling of the order and times comprises:
when a first vGPU among the plurality of vGPUs receives a command from a background OS (BG OS) among the plurality of OSs, determining whether a time for which the command received by the first vGPU is not processed is greater than a preset time; and
when it is determined that the time for which the command received by the first vGPU is not processed is greater than the preset time, the first vGPU informs the BG OS that a predetermined amount of the data of the command is processed.

14. The method of claim 11, wherein, when the FG OS is a host OS, the scheduling of the order and times comprises controlling to exclude the commands from the plurality of OSs except for the host OS from an object to be scheduled.

15. The method of claim 14, wherein, when a first vGPU among the plurality of vGPUs receives a command from the host OS, the scheduling of the order and times further comprises changing an object which is to receive the command from the host OS from the first vGPU to the GPU.

16. The method of claim 11, further comprising:
receiving a user input for selecting the scheduling mode through the menu displayed on the screen.

17. The method of claim 16, further comprising scheduling the order and times according to the scheduling mode selected according to the user input.

18. The method of claim 11, wherein, when a first OS among the plurality of OSs transmits a command to a first address of a memory included in a first vGPU among the plurality of vGPUs, the first address is converted into a second address for accessing a memory of the GPU so as to process the command at the second address of the memory of the GPU.

19. A non-transitory computer-readable recording medium having recorded thereon a program for performing the method of claim 11 in a computer.

20. The device of claim 1,
wherein the general scheduling mode is set as a default mode,
wherein, in the FG-oriented mode, a vGPU receiving a command from an FG OS is set to first access the GPU and to process the command,
wherein, in the BG stop mode, a vGPU corresponding to a BG OS is excluded from an object to be scheduled when an FG OS is a host OS,
wherein, in the direct access mode, a command from an FG OS is directly transmitted to the GPU, and
wherein, in the indirect access mode, a command from an FG OS is transmitted to the GPU via the GPU mediator.

* * * * *